United States Patent [19]

Allain et al.

[11] 3,997,393
[45] Dec. 14, 1976

[54] DEVICE FOR PROTECTING THE CONTAINMENT VESSEL DOME OF A NUCLEAR REACTOR

[75] Inventors: Albert Allain, Bruyeres-le-Chatel; Etienne Filloleau, Houilles; Pierre Mulot, Brunoy, all of France

[73] Assignee: Commissariat a l'Energie Atomique, Paris, France

[22] Filed: Apr. 10, 1975

[21] Appl. No.: 567,028

[30] Foreign Application Priority Data

Apr. 11, 1974 France .............................. 74.12839
June 10, 1974 France .............................. 74.19970

[52] U.S. Cl. .................................. 176/38; 176/30; 176/87
[51] Int. Cl.[2] .................... G21C 9/00; G21C 19/20
[58] Field of Search .................. 176/30, 31, 32, 40, 176/37, 38, 87; 214/18 N; 52/98–99, 105, 110, 573

[56] References Cited

UNITED STATES PATENTS

| | | | |
|---|---|---|---|
| 3,073,771 | 1/1963 | Moulin | 176/32 |
| 3,089,836 | 7/1963 | Wootton | 176/32 |
| 3,165,212 | 1/1965 | Gerarb | 176/30 |
| 3,173,844 | 3/1965 | Jones | 176/30 |
| 3,445,971 | 5/1969 | Desmarchais et al. | 52/98 |
| 3,563,855 | 2/1971 | Marko | 176/38 |
| 3,597,317 | 8/1971 | Isaac | 176/30 |
| 3,773,376 | 11/1973 | Orange | 176/30 |

Primary Examiner—Samuel W. Engle
Assistant Examiner—S. A. Cangialosi
Attorney, Agent, or Firm—Sughrue, Rothwell, Mion, Zinn & Macpeak

[57] ABSTRACT

A device for protecting the dome of a nuclear reactor containment vessel against the upward displacement of the concrete shield slab of said reactor and the resultant effects of tilting of an equipment unit mounted on the shield slab at the periphery of said slab, wherein said device comprises:

—means for separating the equipment unit into two sections consisting of an upper section and a lower section, said lower section being rigidly fixed to said shield slab and said means being actuated by the upward displacement of said slab, —a system for vertical rectilinear guiding of said upper section within the containment vessel, —rigid mechanical components which provide a coupling between the aforesaid upper and lower sections of the equipment unit and exert on said upper section under the action of the tilting motion of said lower section a thrust which causes the upward displacement of said upper section.

14 Claims, 6 Drawing Figures

DEVICE FOR PROTECTING THE CONTAINMENT VESSEL DOME OF A NUCLEAR REACTOR

This invention relates to a device for protecting the dome of a nuclear reactor containment vessel against the effects of possible lifting of the reactor vault roof or top shield slab which in turn results in tilting of equipment placed on the slab.

A number of reactor system components including handling arms or fuel element transfer hoods are usually mounted on a reactor vault roof and within the leak-tight dome of the containment vessel. In the event of upward displacement of the concrete shield slab as a result of a fault condition arising from any cause, the above-mentioned reactor system components are liable to come into contact with the dome and damage this latter. The present invention is accordingly concerned with a device which sets a limitation on hazards of this type.

In accordance with the main feature of the invention, lifting of the concrete shield slab is used for the purpose of dislocating the equipment unit mounted thereon in order to protect the dome against tilting of said unit. Said dislocation has the effect of separating the unit into two sections, namely a lower section which remains rigidly fixed to the shield slab and therefore also undergoes a tilting movement and an upper section which is guided in its displacement with the result that this latter does not come into contact with the dome.

In more exact terms, the invention relates to a device for protecting the dome of a nuclear reactor containment vessel against the upward displacement of the concrete shield slab of the reactor and the resultant effects of tilting of an equipment unit mounted on said shield slab at the periphery of this latter, the device being distinguished by the fact that it comprises:

— means for separating the equipment unit into two sections consisting of an upper section and a lower section, said lower section being rigidly fixed to said shield slab and said means being actuated by the upward displacement of the slab;

— a system for vertical rectilinear guiding of said upper section within the containment vessel;

— rigid mechanical components which provide a coupling between the aforesaid upper and lower sections of the equipment unit and exert on said upper section under the action of the tilting motion of said lower section a thrust which causes the upward displacement of said upper section.

When the equipment unit is contained in a lock-chamber, means are provided for shearing said lock-chamber at the time of tilting in order to initiate dislocation.

In a first embodiment of the invention, the device is distinguished by the fact that the rigid mechanical components which serve to couple together the upper and lower sections of the equipment unit are constituted by at least one crank-arm in which the heads are connected respectively to said upper and lower sections by means of pivot-pins.

In a second embodiment, said rigid mechanical components are constituted by sets of runner-wheels which are attached to the lower section of the equipment unit and on which the upper section is applied.

A more complete understanding of the characteristic features and advantages of the invention will in any case be gained from the following description which is given solely by way of explanation without any limitation being implied, the desired objective being to protect the containment vessel dome against tilting of an equipment unit which consists in particular of a hood for transferring fuel assemblies between the reactor core and a fuel store. In the description given hereinafter, reference is made to the accompanying drawings, wherein.

Figure 1:
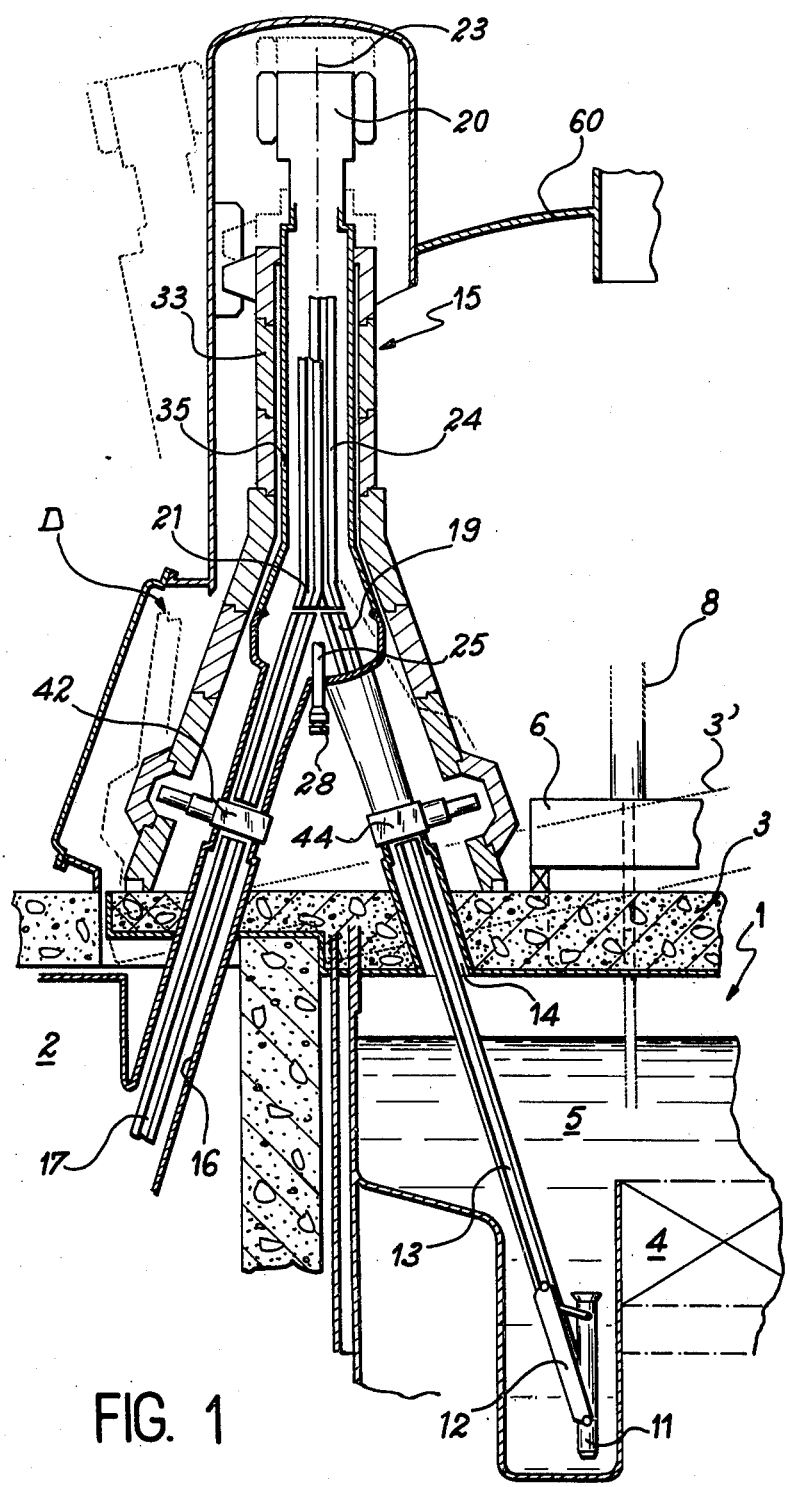
FIG. 1 shows diagrammatically a fuel assembly transfer hood mounted on the concrete shield slab of a nuclear reactor and provides a schematic illustration of the principle of dislocation in which said transfer hood is separated into two sections at the time of displacement of the shield slab by tilting.

FIG. 1 shows a nuclear reactor 1 such as a fast reactor and a fuel store 2 which is adjacent to said reactor and intended to accommodate fuel assemblies. There is placed within the interior of said reactor a core 4 which is immersed in a coolant liquid 5 such as liquid sodium, for example. The top concrete shield slab of the reactor is designated by the reference 3 and is provided with a system which gives access to the interior of the reactor and consists of an assembly of rotating shields 6 and a handling arm 8.

A fuel assembly can be removed from the reactor core by means of the arm 8 and placed in a handling flask 11 which is associated with a carriage 12. Said carriage is capable of displacement along an inclined primary guide ramp 13 which traverses the shield slab 3 through a passage 14 and which is extended by a set of rails 19 within a transfer device 15.

Similarly, the fuel store 2 comprises a secondary guide ramp 17 which traverses the shield slab 3 through a hole 16 and is extended by rails 21 within the transfer device 15.

The top end of each carriage is fitted with a coupling member attached to the extremity of a lifting chain (not shown in the drawings) which is wound onto the drum of a winch 20 located at the top portion of the device 15.

The transfer device 15 can be mainly constituted by a rotating portion of the rotor type. In the example shown in FIG. 1, the rotor 25 is capable of pivotal motion about the axis 23 and is mainly constituted by the two sets of rails 19 and 21 which are rigidly fixed to a vertical pivotal shaft 25. The rotating portion is capable of moving by means of sets of roller-bearings (not shown) and suitable driving means 28 mounted at the lower end of the shaft 25. The rotor-type transfer device is placed within a protective enclosure constituted by a shield structure 33 of cast-iron or of lead lined with a leak-tight casing 35.

The lower portion of the transfer device rests on the top shield slab 3 and contains valves 42 and 44 which are located above the penetrations 14 and 16.

The transfer hood 15 is mounted within the dome 60 of the reactor containment vessel. The invention ensures protection of said dome against any tearing which might be caused by tilting of the transfer hood as a result of upward displacement of the top closure or shield slab 3.

In accordance with an essential feature of the invention, the upward displacement of the closure slab 3 is employed as a driving force for causing the dislocation of the transfer hood and separating this latter into two sections. In FIG. 1, the shield slab is shown diagrammatically in the inclined position (reference 3'). Separation of the hood into two sections takes place at the level of the reference D. The lower section of the hood is displaced in tilting motion together with the slab which supports this latter but the upper section carries out a movement of vertical rectilinear translation which brings it from the initial position shown in full lines to the final position shown diagrammatically in dashed outline. The thrust exerted on the upper section of the transfer hood can be obtained by different means including a crank-arm system or a runner-wheel system as will now be described in detail with reference to FIGS. 2 and 3.

Figure 2:
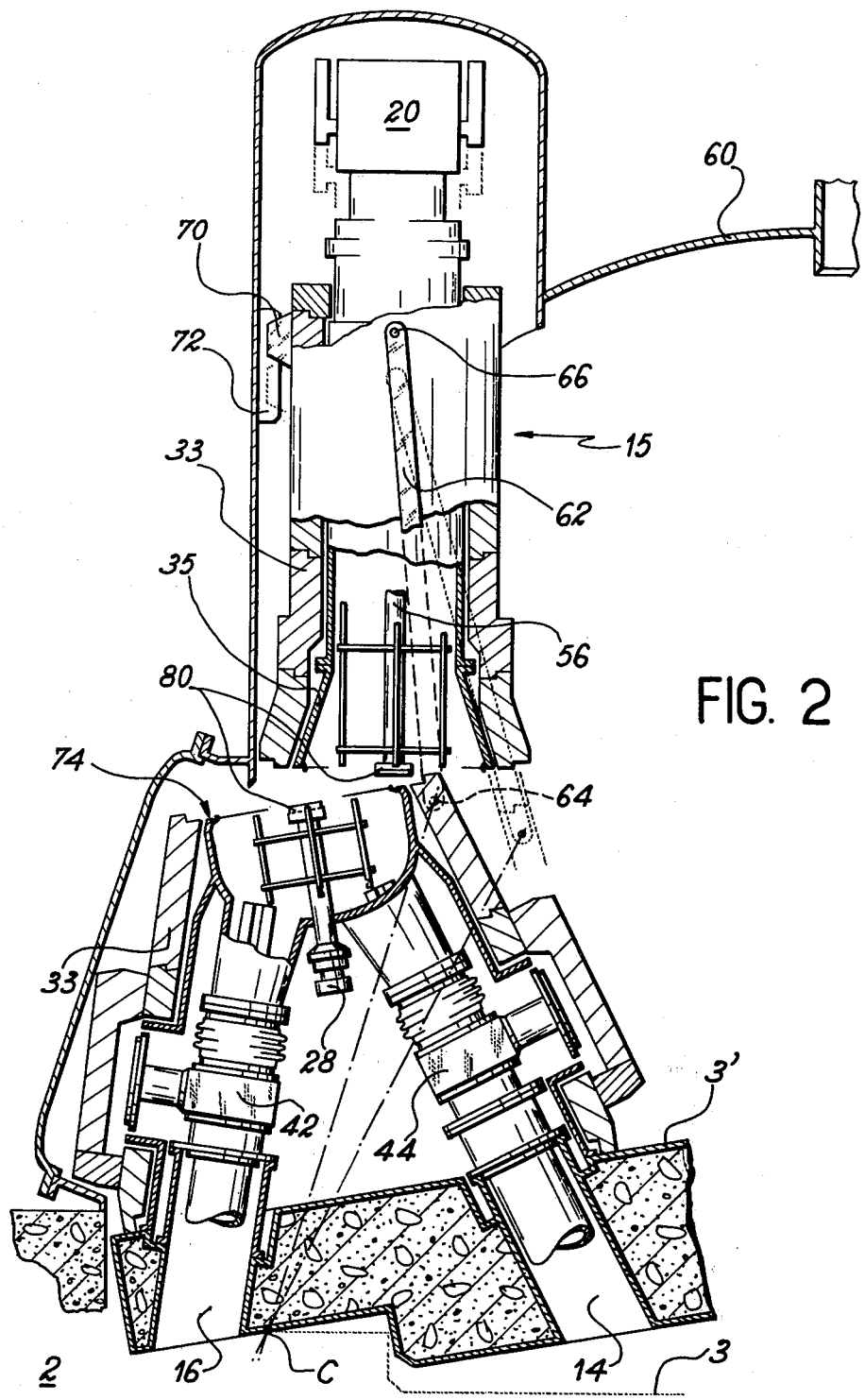
FIG. 2 illustrates a first alternative embodiment of the invention in which the mechanical components for providing a coupling between the upper and lower sections of the transfer hood are constituted by a crank-arm system.

In the first alternative embodiment illustrated in FIG. 2, the mechanical components which provide a connection between the upper and lower sections of the transfer hood are constituted by a crank-arm system. More precisely, this figure shows a rotor lock-chamber in which the lower section is assumed to have tilted under the action of lifting of the top shield slab which has been displaced to position 3' whilst the upper section of the lock-chamber is in the top position. The two sections are coupled together by means of two link-arms located symmetrically with respect to the lock-chamber and in the tilting plane; the only link-arm which is visible in the figure is located in front and bears the reference numeral 62. This link-arm is connected to the lower section by means of a pivot-pin 64 and to the upper section by means of a pivot-pin 66.

The top portion of the rotor lock-chamber is connected to the containment vessel dome by means of a system which comprises a sliding shoe 70 and a guide 72 and serves to transmit the horizontal reaction at the time of tilting. It is clearly possible to make provision for a number of shoe and guide systems around the rotor lock-chamber.

The internal casing 35 is designed to shear along the portion designated by the reference 74 at the moment of lifting of the top shield slab. So far as concerns the separation of the rotor assembly into two sections, this is achieved by a disconnectable coupling means 80 constituted by a device of the screw-driver type, for example. Said device is so arranged as to ensure that the upper and lower portions of the shaft 25 are coupled together in the normal position, that is to say when no tilting takes place, and uncoupled when the lower section of the equipment unit has tilted.

In this alternative form of construction, the center of rotation of the lower section is located at C and the center of thrust, during the tilting movement, is exerted on the axis of the pivot-pins 66. The center of gravity of the upper movable section is therefore located below the center of thrust and this has a favorable effect in maintaining the upper portion of the lock-chamber in a vertical position during its displacement.

Figure 3:
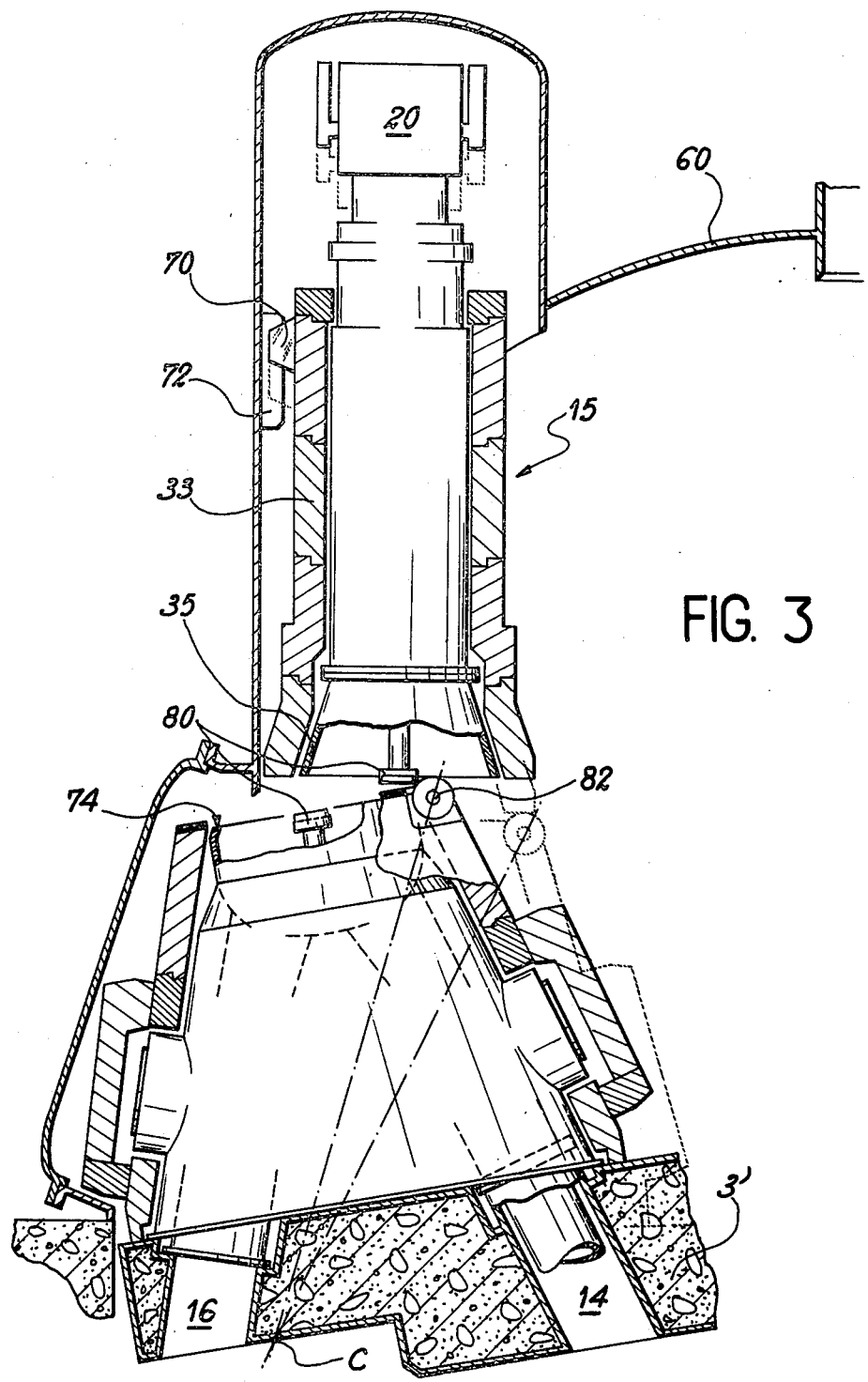
FIG. 3 illustrates a second alternative embodiment in which said components are constituted by runner-wheels.

FIG. 3 illustrates a second alternative embodiment in which the mechanical components for providing a connection between the upper and lower sections of the transfer hood are constituted by two runner-wheels symmetrically mounted on pivot-pins. The front runner-wheel is alone visible in this figure and designated by the reference 82.

The principle of dislocation of the equipment unit is identical with that of the alternative embodiment illustrated in FIG. 2. Accordingly, provision is again made for an uncoupling component 80 of the screw-driver type for example, and means for ensuring that the leak-tight casing shears along the line 74. The upper section is also provided with a guide system formed by a sliding shoe 70 and a guide 72.

In this second alternative embodiment, the center of thrust of the upper section takes place at the level of the runner-wheels and is therefore located below the center of gravity of said upper section.

Figure 4:
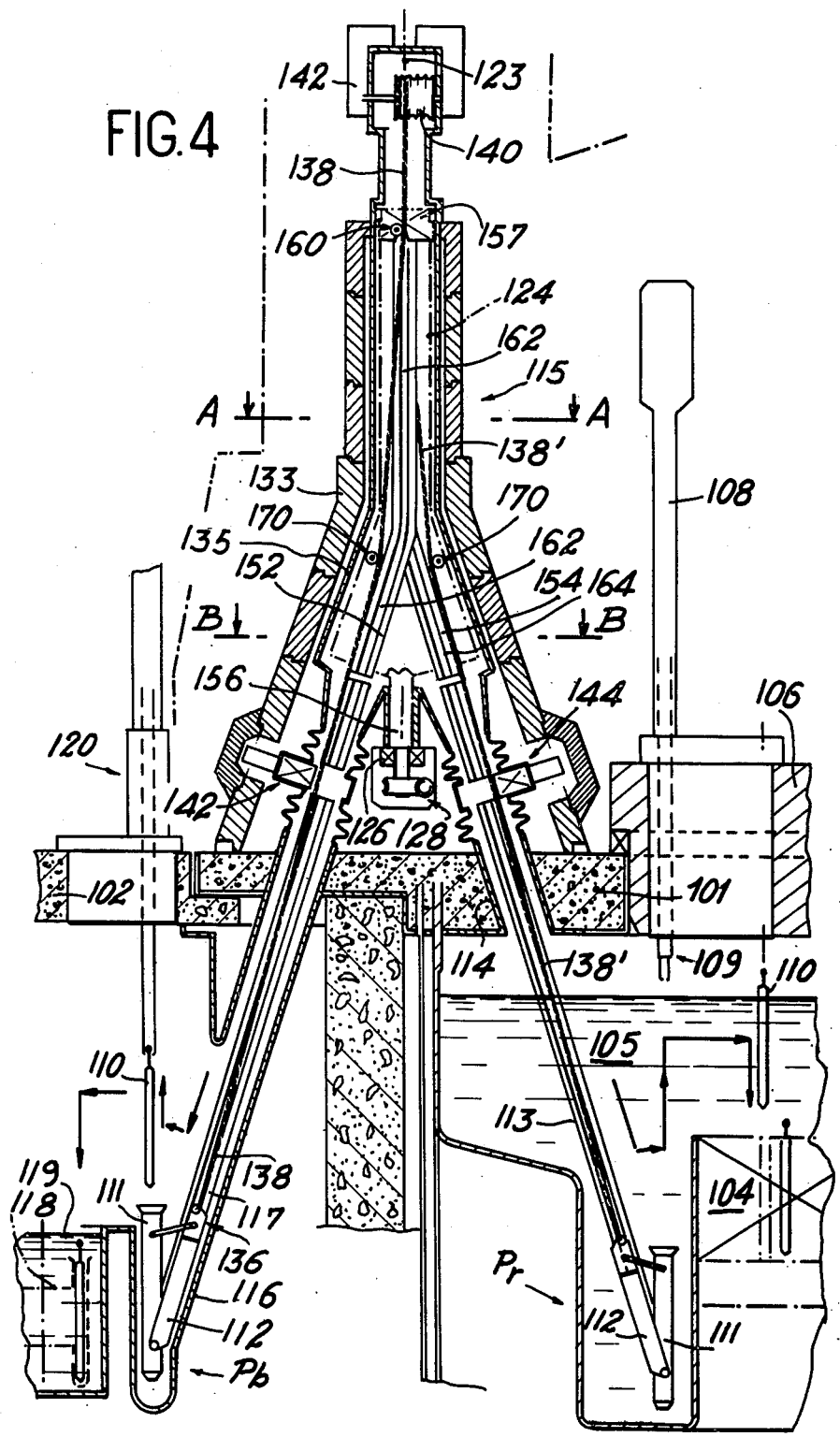
FIG. 4 is a general diagrammatic view of the rotor-type transfer device in accordance with the invention.

FIG. 4 is a general diagrammatic view of the rotor-type transfer device in accordance with the invention. There are shown in this figure the concrete vault 101 of a nuclear reactor, especially a fast reactor, and a fuel store 102 which is adjacent to the reactor vault 101 and intended to receive fuel assemblies which have either been removed from the reactor vessel or are ready to be introduced into this latter. There is placed inside the vault 101 the reactor core 104 as shown diagrammatically and constituted by the group of fuel assemblies immersed in a coolant liquid 105 which usually consists of liquid sodium. The top closure slab or roof of the reactor vault 101 comprises a system which gives access to the interior of this latter and is formed by a rotating shield arrangements 106 in which one shield is mounted eccentrically within the other in accordance with known practice. The relative movements of said two rotating shields accordingly permit a handling arm 108 which passes axially through the rotating shield system 106 to come into position above any predetermined fuel assembly 110 of the reactor core 104.

The removal of one of the fuel assemblies from the reactor core by means of the arm 108 takes place within the interior of the reactor vault and permits of separate transfer of each fuel assembly from the reactor core 104 to a suitably oriented handling flask 111 located at a reactor charge-discharge station designated in FIG. 4 by the reference Pr. The flask 111 is associated with a carriage 112 which is capable of displacement along an inclined primary guide ramp 113 which passes through the upper portion of the reactor vault 1 through a passage 114. Said inclined guide ramp 113 is extended by a set of rails 154 forming part of a transfer device 115, the constructional detail of which will be explained hereinafter. The guide ramp 113, the carriage 112 and the flask are so designed as to ensure that said flask is restored to the upright position as it reaches the end of travel at the bottom of the guide ramp after displacement by means of rollers which run in suitable tracks.

Similarly, the fuel store 102 has a through-passage 116 for a secondary guide ramp 117 having the same angle of inclination to the vertical as the ramp 113 but located in a plane which is different from this latter. In the example considered herein by way of explanation, the planes of the two guide ramps are vertical, parallel and symmetrical with respect to the vertical axis 123 of the transfer device 115. A magazine 118 of the rotary drum type, for example, is provided for the fuel assemblies 110 within the interior of the fuel store 102 and immersed in a suitable volume 119 of liquid sodium; a fuel-handling device 120 is provided for the withdrawal of said fuel assemblies 110 from the flask 111. In the lowermost position on the secondary guide ramp 117, the flask is located at a so-called charge-discharge station of the rotary drum as designated in FIG. 4 by the reference P$b$; at this station, resetting of the flask in its upright position again takes place as a result of the interaction of rollers and guide tracks.

Each carriage 112 is drawn by a fall arrester fitted at the upper extremity with a coupling member 136 and this latter is attached to the extremity of a lifting chain 138 or the like which is wound onto the drum 140 of a winch which is located in a fixed position and driven by a reduction-gear motor 142. Depending on their positions, the lifting chains 138 (and 138' if provision is made for two symmetrical guide ramps) can be applied against abutment pulleys 170 and 170'. Moreover, each chain is guided by a pulley 160 mounted at the top portion of the rails.

The lower extremity of the transfer device 15 rests on the surface of the concrete roof of the reactor vault 101 and is intended to be placed over the through-passages 114 and 116 of the guide ramps 113 and 117. Said device comprises a rotating portion 124 which is capable of moving in rotation about the vertical axis 123 by means of sets of roller-bearings 126 or the like. Said moving portion is driven by suitable means 128 as represented diagrammatically, such means being of the toothed ring type for example and driven by a reduction-gear motor.

The transfer device 115 comprises a protective enclosure constituted by a shield structure 133 of cast-iron or of lead. Said shield structure 133 is lined with a leak-tight casing 135 and can also be lined with a layer of heat-insulating material (not shown). A plug 157 provides a top closure for the lock-chamber.

Valves 142 and 144 provided in the bottom portion of the transfer device are located above the reactor vault roof penetrations 114 and 116 and serve to isolate the lock-chamber of the transfer device from the reactor and the fuel store. Each isolating valve can be fitted with a valve-disc $\alpha$ for ensuring leak-tightness and with a slide-valve $\gamma$ for shielding purposes in accordance with known practice.

As already emphasized in the foregoing, the originality of the transfer device 115 according to the invention lies in the presence of a rotor 124 which is capable of pivotal motion about the axis 123 and comprises two sets of elbowed rails 152 and 154 which are rigidly fixed to a vertical pivotal shaft 156. Said elbowed rails are advantageously disposed in vertical planes and so arranged as to ensure that their lower ends are capable of coming in the line of extension of the upper extremity of the guide ramps as a result of pivotal motion of the rotor.

In the example of construction which is illustrated in FIG. 4, the upper ends of the sets of rails 152 and 154 are vertical, with the result that the overall size of the entire rotor-type transfer device is reduced to a minimum. It would not constitute any departure from the scope of the invention, however, to employ rails which retain partial obliquity or which even have a slightly helical configuration.

Figure 5:
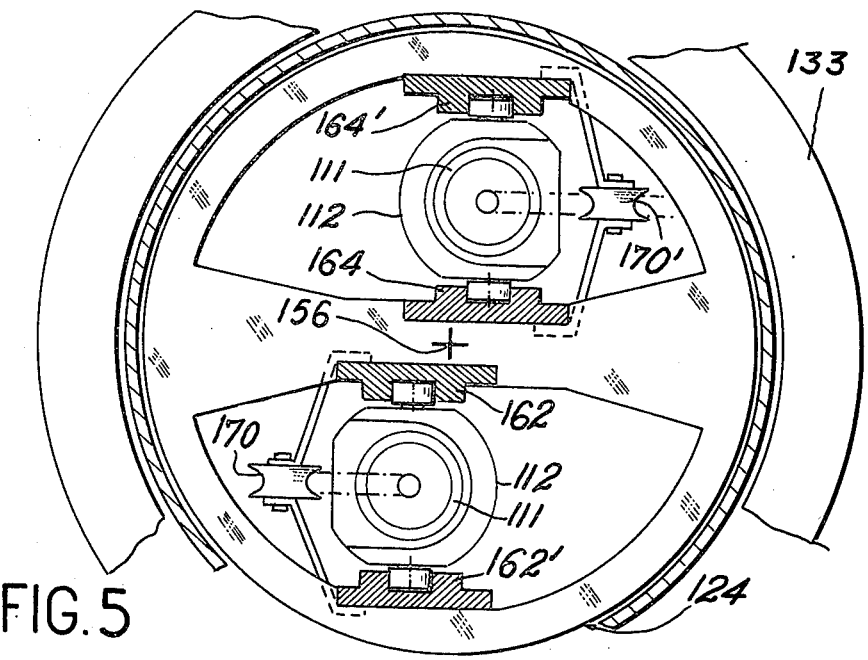
FIG. 5 is a horizontal sectional view illustrating the relative positions of the sets of rails in the upper portions thereof.

FIG. 5 is a horizontal sectional view taken along line A—A of the device shown in FIG. 4 and illustrates the relative positions of the sets of rails in the vertical upper portion of these latter in the case in which the device comprises two symmetrical sets of rails. In this figure, the set 152 comprises two rails 162—162' and the set 154 comprises two rails 164—164'; the rails 162 and 164 are directly secured to the rotating shaft 156. A carriage 112 as shown diagrammatically is guided in its vertical displacement between the rails of each set. The lifting chains 138 and 138' are applied against the abutment pulleys 170 and 170'.

Figure 6:
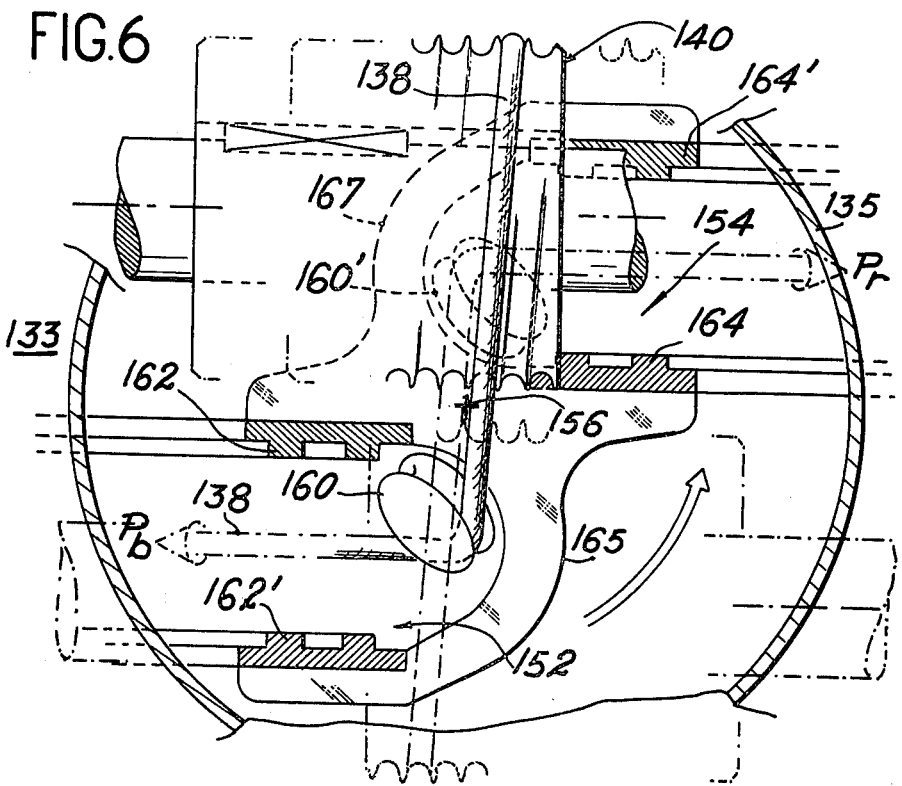
FIG. 6 illustrates the positions of the operating winches and of the guide pulleys with respect to the rails.

FIG. 6 is a horizontal sectional view taken along line B-B of the device shown in FIG. 4 and illustrates the positions of the operating winches and of the guide pulleys. Said winches are stationary and of identical design. The winch of the upper portion corresponds to the winch shown in FIG. 4; it comprises a drum 140 on which is wound the chain 138 in grooves which are provided for this purpose and a rotating shaft 174 driven by a reduction-gear motor system which has been omitted from the drawings since this latter is of conventional design. The lifting chain 138 is caused to deviate from its path by the pulley 160. The rails 164 and 164' are connected to said shaft by arms 165 and 167.

During normal working, the cycle of operations is as follows. An irradiated fuel assembly is deposited by the handling device of the reactor within the flask of the carriage which is located at the reactor charge-discharge station (P$r$). A fresh fuel assembly is deposited within the flask supported by the carriage which is located at the charge-discharge station of the rotary drum (P$b$) of the fuel store by means of the handling device of said store.

The operation which consists in removing an irradiated fuel assembly takes place by upward displacement of the carriage located at the charge-discharge station (P$r$) along the primary guide ramp 113, then along one of the two sets of rails 154 of the rotor; at the same time, the carriage located at the charge-discharge station of the rotary drum (P$b$) moves upwards along the secondary guide ramp 117 and the other set of rails 152 of the rotor.

When the two carriages have reached the upper ends of the sets of rails, the pivotal motion of the rotor through an angle of 180° about the axis 123 brings the carriage which supports the irradiated fuel element to the same side as the secondary guide ramp 117 and brings the carriage which supports the fresh fuel element to the same side as the primary guide element 113. Downward motion of the carriages then takes place along the rails of the rotor and is followed by the downward motion of one of the carriages along the secondary guide ramp 117 to the charge-discharge station of the rotary drum while the other carriage moves at the same time along the primary guide ramp 113 until it reaches the charge-discharge station of the reactor.

The irradiated fuel assembly is then removed from the flask located at the charge-discharge station of the rotary drum by means of the handling device of said drum and the fresh fuel assembly is removed from the flask located at the reactor charge-discharge station by means of the handling device.

It is worthy of note that, during this normal operating cycle, the initial transfer takes place with an empty carriage when starting from the charge-discharge station of the reactor and that the final normal transfer takes place with an empty carriage when starting from the charge-discharge station of the rotary drum.

During normal operation, the upward and downward movements of the two carriages take place simultaneously although it would clearly not constitute any departure from the scope of this invention if these movements were to take place separately and independently.

Apart from these essential arrangements, the equipment unit in accordance with the invention can comprise ancillary means which are briefly as mentioned below.

The lock-chamber can be heated electrically so as to be brought to a suitable temperature for handling operations and cooled by a circulation of air along its external wall in order to facilitate removal of the heat output released by an irradiated fuel element.

Means can be provided for initiating the opening and closing of the valves at the appropriate moments.

Each winch can be associated with reduction-gear motors which are advantageously provided with two lifting speeds, for example a speed of the order of 136 mm/s and a speed of 15 mm/s. The low speed is employed when the carriage is located in the upright-position zone at the bottom portion of the guide ramps or when the carriage is located within the rotor in a zone which terminates at the top position of this latter and if necessary when passing opposite to the valves.

Different components can be associated with the means for driving the winch and especially a device for continuously measuring the tension of the chain, a torque-limiting device on each winch drive mechanism and devices for indicating the position of the carriage by means of contact elements actuated directly by the carriage and/or by a device which is driven by the shaft of the winch drum and associated with the unwinding of the chain.

Provision can also be made for a continuous indication of the carriage position which is given by the length of chain wound-off.

Stopping of the rotor in the position in which the rails are located in the line of extension of the guide ramps can be ensured by means of mechanical stops.

It is readily apparent that the example used in the foregoing description has not been given in any sense by way of limitation and that, instead of employing two sets of rails associated with two guide ramps, it would be possible without departing from the scope of the invention to employ a plurality of N sets of rails associated with N inclined guide ramps arranged in a cone-shaped assembly about the pivotal shaft of the rotor which would then be capable of performing rotational displacements of $2\pi/N$; this alternative form of construction would correspond to the construction of N fuel stores placed around the reactor.

On all matters concerning the handling of fuel elements in a nuclear reactor and especially a fast reactor, reference can be made for example to the article by E. Benoist and C. Boulinier entitled "The PHenix Power Station" and published in the review entitled "Energie Nucleaire," volume 13, No. 3, May—June, 1971.

What we claim is:

1. In a nuclear reactor containment vessel of the type having a concrete shield slab, a dome and equipment means mounted on said slab at the periphery thereof adjacent said dome, the improvement comprising said equipment means having a lower section rigidly fixed to said shield slab, an upper section for separation along a predetermined line in response to tilting of said said slab upwardly and outwardly toward said periphery due to excessive pressure within said vessel connected to said lower section, guide means on said containment vessel for vertical rectilinear guiding of said upper section and mechanical means operatively connected between said upper and lower sections which will exert an upward thrust on said upper section upon said tilting of said slab and lower section with an attendant separation of said upper and lower lower sections.

2. In a containment vessel as set forth in claim 1 further comprising lock-chamber means enclosing said equipment means and having means to provide for the separation of said lock-chamber means upon tilting of said slab and separation of said upper and lower sections.

3. In a containment vessel as set forth in claim 1 wherein said guide means for the rectilinear guiding of said upper section of said equipment means is constituted by at least one reaction shoe rigidly fixed to said upper section and a vertical guide rigidly fixed to said dome for the sliding reception of said shoe.

4. In a containment vessel as set forth in claim 1 wherein said mechanical means comprises at least one crank arm disposed in the plane of tilting, said crank arm being connected at opposite ends to said upper and lower sections, respectively, by means of pivot pins.

5. In a containment vessel as set forth in claim 1 wherein said mechanical means comprises at least one runner wheel rotatably connected to said lower section for engagement with said upper section upon tilting of said slab and lower section.

6. In a containment vessel as set forth in claim 1 wherein said equipment means is comprised of transfer means for transferring fuel assemblies between a reactor core and a fuel store.

7. In a containment vessel as set forth in claim 6 wherein said transfer means is comprised of at least two stationary oblique guide ramps inclined to the vertical and extending through passage means in said slab, one of said ramps being adapted to penetrate into a reactor core and the other guide ramp being adapted to penetrate into a fuel store, protective enclosure means carried by said slab and surrounding said transfer means, rotor means disposed in said protective enclosure means comprising at least two substantially vertical sets of rails disposed in alignment with the upper ends of said guide ramps, respectively, and means for rotating said rotor means to alternately align said rails and said ramps, said transfer means further including hoist means mounted above said protective enclosure means, carriage means for supporting a flask containing a fuel assembly and flexible means connected to said carriage means and said hoist means for raising and lowering said carriage means along said rails and ramps.

8. In a containment vessel as set forth in claim 7 wherein said guide ramps and said sets of rails are disposed in vertical planes.

9. In a containment vessel as set forth in claim 7 wherein said rails are elbowed and are provided with vertically extending top portions.

10. In a containment vessel as set forth in claim 7 wherein the lower portion of said rotary means is supported by roller bearings on a stationary base rigidly secured to said slab, said rotor means including a shaft having disconnectable coupling means, a driving element for said shaft and reduction gear motor means operatively connected to said driving element.

11. In a containment vessel as set forth in claim 7 wherein said hoist means includes stationary winches set at the half-angle of rotation of the movable rails.

12. In a containment vessel as set forth in claim 7 wherein said transfer means includes mechanical abutment members for stopping the rotary motion of the rotor means in the positions in which the lower portions of the rails are located in the line of extension of the guide ramps.

13. In a containment vessel as set forth in claim 7 wherein said transfer means comprises two systems of rails which are symmetrical with respect to the axis of the rotor means, the rotary motion of the rotor means which causes a set of rails initially located at the line of extension of one guide ramp to be displaced in the line of extension of the other guide ramp being carried out through an angle of 180°.

14. In a containment vessel as set forth in claim 10 wherein said disconnectable coupling means is of the screwdriver type.

* * * * *